Feb. 20, 1934.  J. R. SILVER, JR  1,948,081
METHOD OF AND APPARATUS FOR MAKING BATTERY PLATE SEPARATORS
Filed Jan. 3, 1929  2 Sheets-Sheet 1
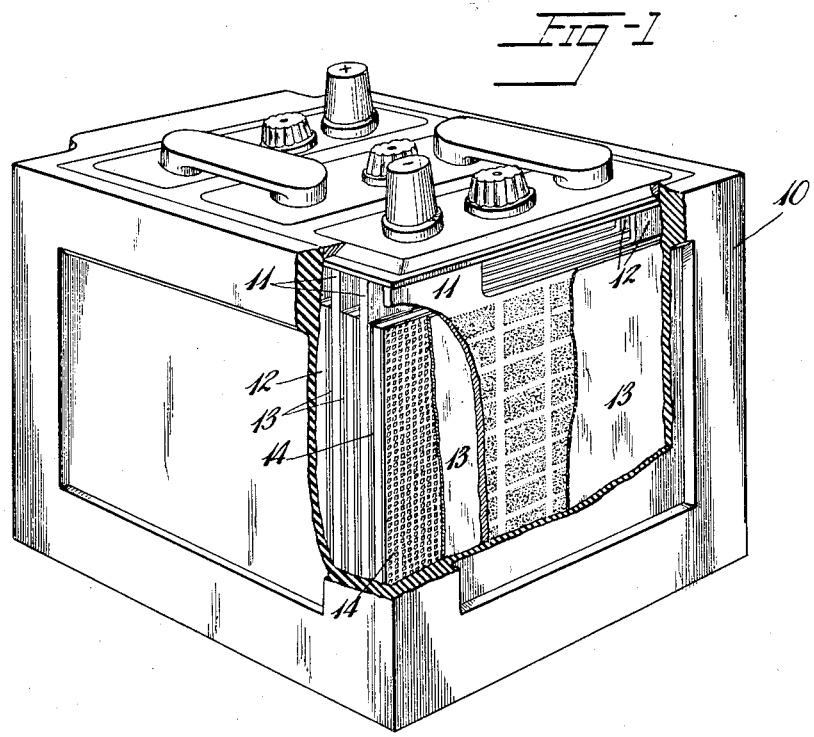
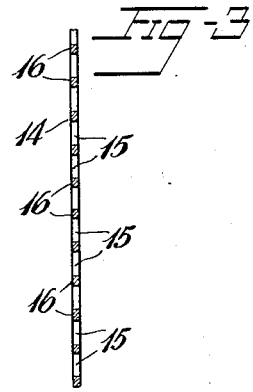
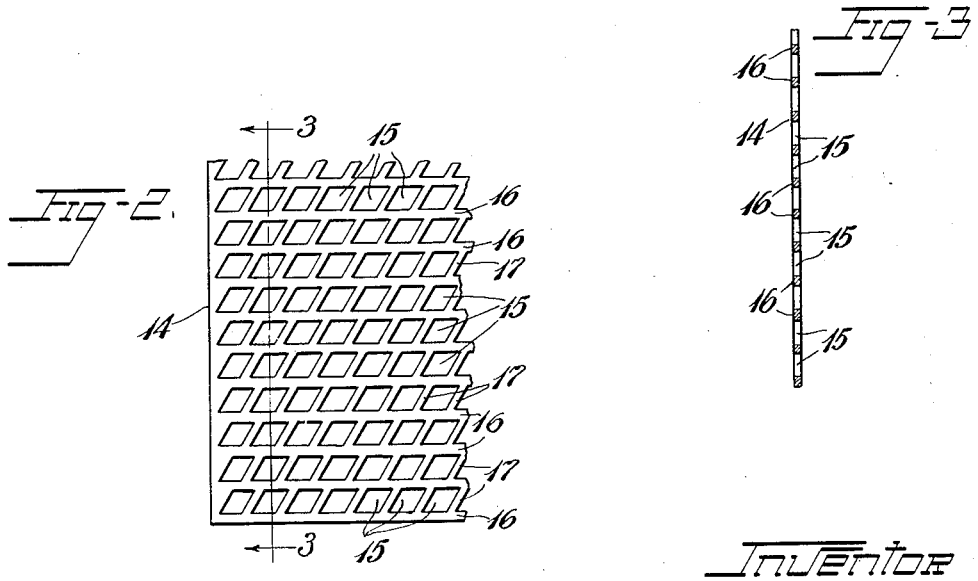
Inventor
Joseph R. Silver Jr.
By Eakin & Avery
Attys.

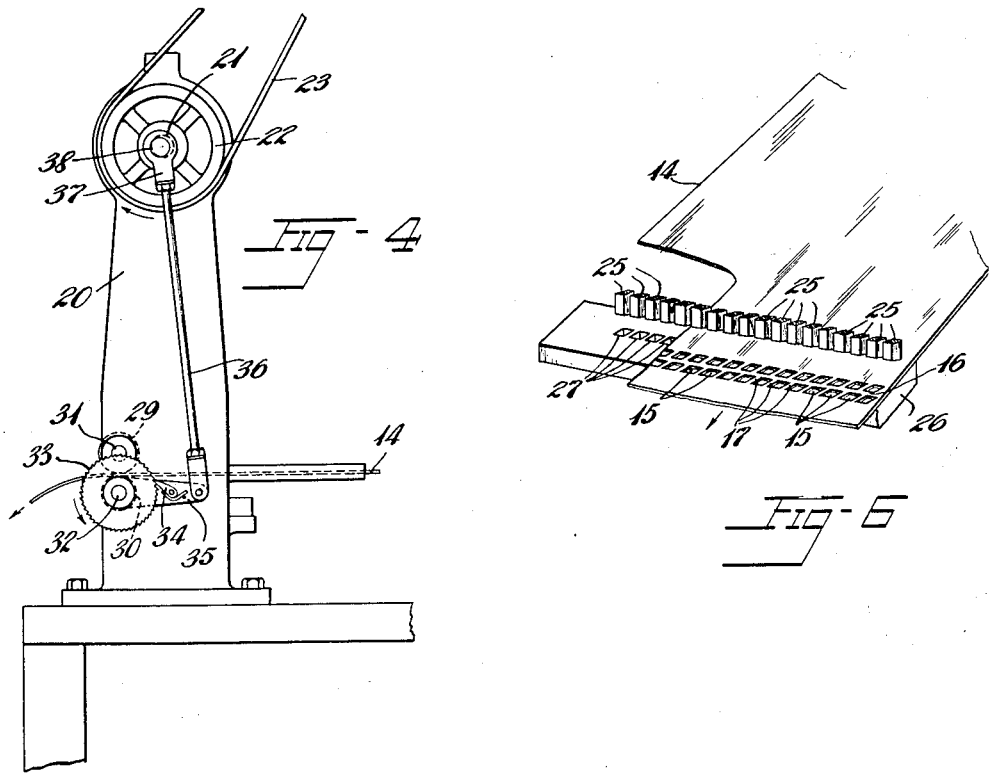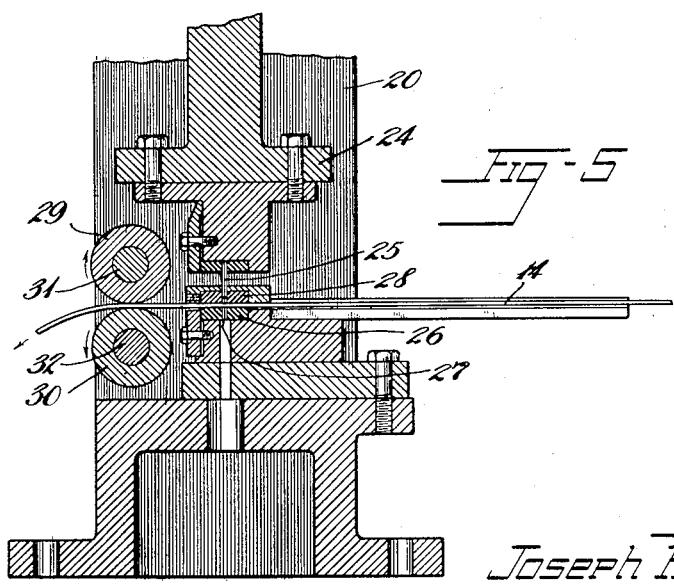

Patented Feb. 20, 1934

1,948,081

UNITED STATES PATENT OFFICE 1,948,081

METHOD OF AND APPARATUS FOR MAKING BATTERY PLATE SEPARATORS

Joseph R. Silver, Jr., Akron, Ohio, assignor to The B. F. Goodrich Company, New York, N. Y., a corporation of New York Application January 3, 1929. Serial No. 330,111

2 Claims. (Cl. 164—89)

This invention relates to methods and apparatus for making battery-plate separators, and especially relates to procedure and apparatus for making perforated rubber separators which are used in conjunction with battery plate separators of porous wood.

Perforated rubber separators of the character mentioned as heretofore made either have not had sufficient porosity for efficient operation of the battery, or great care has been required to prevent breakage and tear during the perforating operation and such difficulties in the manufacture of the plates have rendered production thereof relatively slow and expensive.

The chief objects of this invention are to provide a perforated rubber separator which will have the desired high porosity; which will have sufficient mechanical strength to permit of its being readily manufactured, handled, and installed; which by reason of the peculiar arrangement of its perforations may be rapidly and economically manufactured; and to provide an improved method and improved apparatus for making the sheet.

High porosity of the separator in conjunction with strength is obtained by making its perforations in the form of parallelograms, preferably rhomboids, which may be positioned close together and yet provide intermediate solid or imperforate portions of uniform width. The perforations are arranged uniformly in vertical and horizontal rows and so disposed in each row that their upper and lower lines are horizontal and coincident and their side lines are parallel. The result is a structure having straight and uninterrupted horizontal zones of imperforate material between horizontal rows of perforations, and having, between vertical rows of perforations, zones of imperforate material comprising individual oblique portions which intersect the respective horizontal rows of imperforate material opposite the sides of perforations to produce a zig-zag effect in the vertical columns of imperforate material. When, as is here shown, each perforation is of a length not much greater than its width, preferably not more than twice its width, the result is a very strong as well as a highly porous sheet, long reaches of material having no lateral support in their intermediate portions being avoided.

Of the accompanying drawings:

Fig. 1 is a perspective view of a storage battery embodying my invention in its preferred form, parts being broken away and in section.

Fig. 2 is a plan view, on a larger scale, of my improved battery plate separator.

Fig. 3 is a section on line 3—3 of Fig. 2.

Fig. 4 is a side elevation of apparatus embodying and adapted to carry out my invention for producing my improved battery plate separators.

Fig. 5 is a fragmentary vertical section, on a larger scale, of the apparatus shown in Fig. 4.

Fig. 6 is a fragmentary perspective view of the work, and the instrumentalities which operate thereon, a part being broken away and parts in section.

Referring to Fig. 1 of the drawings, wherein I show a three-cell storage battery which in general is of known construction, 10 is the dielectric case or jar thereof, 11, 11 are the negative plates and 12, 12 the alternate positive plates thereof, 13, 13 are separator plates of porous wood on each side of each negative plate 11, and 14, 14 are perforated separators of insulating material, preferably vulcanized hard rubber, on each side of each positive plate 12, between the latter and the wooden separators 13.

As shown in Fig. 2, the sheet 14 is formed with a multiplicity of relatively-small, closely-spaced apertures 15, 15 of parallelogram or diamond shape, which are arranged in horizontal and vertical rows. The horizontal rows of apertures are separated by straight horizontal rows of uninterrupted, solid or imperforate material 16, 16, and the vertical rows of apertures are separated by obliquely disposed individual solid portions 17, 17 which because of their angularity, are not coincident or longitudinally aligned with each other, but describe a devious or zig-zag course, notwithstanding the fact that the apertures 15 are vertically and horizontally aligned.

This arrangement of the oblique portions 17 brings their respective ends into intersection with the adjacent horizontal portions 16 at intermediate portions of the apertures 15 on the opposite side of said horizontal portions, with the result that the horizontal portions are braced and stiffened by the portions 17. By reason of the discontinuous arrangement of the portions 17 a longitudinal elasticity or extensibility is provided which permits longitudinal extension of the perforated sheet to a considerable degree without tearing of the sheet either in process of manufacture or in use.

By reason of the particular shape of the apertures 15 I am able to position them sufficiently close together to obviate relatively large imperforate portions between them and thus am able to obtain a sheet having the relatively high porosity desired. The arrangement by which the oblique solid portions 17 reinforce and stiffen the horizontal portions 15 opposite the apertures 16 produces a sheet which has sufficient strength to resist breakage and tear during manufacture and subsequent handling and use.

By reason of the regular and orderly arrangement of the apertures 15 in successive aligned rows, I am able to manufacture the separator sheets rapidly and economically. The method I employ consists in feeding an imperforate sheet of vulcanized hard rubber through a punch press having a single row of punches and complemental dies, and punching the successive rows of apertures in a single passage through the press, the use of a die having the single row of punch elements as described giving the zig-zag effect without requiring either the lateral shifting of the strip with relation to the punch between successive operations of the latter or the punching of alternate rows followed by punching of intervening rows, and the punch-stripping operation is simplified as compared with the use of a punch having a plurality of rows of elements.

Suitable apparatus for perforating my improved separator sheet is shown in Figs. 4 to 6 of the drawings wherein 20 is the frame of a punch press, of usual design, 21 the shaft thereof, 22 the drive-pulley, and 23 a driving belt by which the press is driven from a suitable source of power (not shown). The punch press is provided with the usual reciprocating head 24, and a single row of punches 25, 25 extend downwardly therefrom toward a die plate 26 having formed therein a single row of die-apertures 27, 27 complemental to the punches 25. The punches extend through apertures in a guide or stripper plate 28 positioned above the die-plate 26 and spaced therefrom to provide space for the passage of the sheet 14 of insulating material which may be continuous or of great length.

For feeding the sheet 14 through the punch press in successive steps during the rise of the head 24 after each operative downward stroke, a pair of cooperating feed rollers 29, 30 are mounted at the delivery side of the punches and dies upon respective shafts 31, 32, which are journaled in the frame 20, the surface of the roller 30 preferably being roughened to assure good frictional engagement with the work. One end of the shaft 32, outside the frame 20, is provided with a ratchet 33 which is engaged by a spring-pressed pawl 34 mounted upon a pawl-arm 35 journaled at one end upon said shaft 32, and having its other end connected by a link 36 to a yoke 37 journaled upon a crank-pin or eccentric 38 formed on the end of the shaft 21. The arrangement is such that each revolution of the shaft 21 feeds the strip 14 forward a distance equal to the width of an aperture 15 and imperforate portion 16.

The feed rollers 29, 30 are preferably mounted at a considerable distance from the punches 25 so that any tension applied to the sheet 14, while the punches are engaged therewith, such as would occur due to too advanced timing of the ratchet mechanism or due to overrunning of the feed rollers at high speeds, will be distributed over a sufficient reach of the perforated sheet as to prevent tearing of the same. This is particularly desirable at high speeds. The machine of this invention perforates 1800 rows of holes per minute or six feet of material a minute.

The shape and arrangement of the apertures 15, which results in a sheet of greater mechanical strength, permits the sheet to be fed through the punch press with great rapidity, without danger of breakage or tear. The perforating operation is completed by a single passage through the press and requires but a single row of punches and dies, which, because of their angular contour, are very difficult and expensive to manufacture, and the difficulty would be greatly increased were two rows of punches and dies required to punch the sheet in a single passage through the press.

The invention is susceptible of modification within the scope of the appended claims.

I claim:

1. Apparatus for making battery plate separators, said apparatus comprising a punch press, means engaging the perforated part of a sheet of material for intermittently pulling said sheet of material through said press, a die having a single row of spaced die openings aligned across the path of feed, and a single row of punches for cooperation therewith, the solid parts of the die, between adjacent die openings, being oblique to the line of feed said solid parts providing oblique strands in the punched material so that it will have such extensibility as not to be torn by the pulling means.

2. The method of making a perforated sheet of substantially inextensible material which comprises simultaneously punching from the sheet a series of areas aligned laterally of the sheet and separated by narrow unpunched strips of the sheet inclined to a lateral margin of the sheet, advancing the sheet in the direction of its length by an amount greater than the extent of the punched areas along the line of feed, and then punching from the sheet a similar series of areas separated from the first series by a narrow unpunched strip of the sheet and from each other by narrow unpunched strips inclined with respect to a lateral margin of the sheet and terminating opposite areas removed by the preceding punching step.

JOSEPH R. SILVER, JR.